US009008464B2

(12) United States Patent
Huh (10) Patent No.: US 9,008,464 B2
(45) Date of Patent: Apr. 14, 2015

(54) MEDIA DATA CUSTOMIZATION (75) Inventor: Eui-Nam Huh, Seoul (KR)

(73) Assignee: University-Industry Cooperation Group of Kyung Hee University, Yongin-Si, Gyeonggi-Do (KR)

( * ) Notice: Subject to any disclaimer, the term of this patent is extended or adjusted under 35 U.S.C. 154(b) by 1035 days.

(21) Appl. No.: 12/485,692

(22) Filed: Jun. 16, 2009

(65) Prior Publication Data

US 2010/0316286 A1 Dec. 16, 2010

(51) Int. Cl.
G06K 9/54 (2006.01)
G06K 9/60 (2006.01)
H04L 29/06 (2006.01)
H04L 29/08 (2006.01)

(52) U.S. Cl.
CPC .......... H04L 65/605 (2013.01); H04L 67/2823 (2013.01); H04L 67/306 (2013.01); H04L 67/04 (2013.01)

(58) Field of Classification Search
USPC .................................................. 382/164, 305
See application file for complete search history.

(56) References Cited

U.S. PATENT DOCUMENTS

| 5,396,616 | A | * | 3/1995 | Venable | 703/27 |
| 5,913,038 | A | * | 6/1999 | Griffiths | 709/231 |
| 6,005,984 | A | * | 12/1999 | Kawakami et al. | 382/276 |
| 6,377,265 | B1 | * | 4/2002 | Bong | 345/505 |
| 6,412,061 | B1 | * | 6/2002 | Dye | 712/32 |
| 6,581,102 | B1 | * | 6/2003 | Amini et al. | 709/231 |
| 6,728,870 | B1 | | 4/2004 | Roth et al. | |
| 6,779,119 | B1 | * | 8/2004 | Moshfeghi et al. | 726/23 |
| 6,850,947 | B1 | * | 2/2005 | Chung et al. | 707/600 |
| 6,862,677 | B1 | * | 3/2005 | Stravers | 712/218 |
| 7,283,686 | B2 | * | 10/2007 | Larson et al. | 382/303 |
| 8,099,583 | B2 | * | 1/2012 | Wang | 712/219 |
| 8,259,121 | B2 | * | 9/2012 | Law et al. | 345/506 |
| 8,370,609 | B1 | * | 2/2013 | Favor et al. | 712/225 |
| 2002/0103881 | A1 | | 8/2002 | Granade et al. | |
| 2002/0103908 | A1 | | 8/2002 | Rouse et al. | |
| 2003/0122825 | A1 | * | 7/2003 | Kawamoto | 345/428 |
| 2003/0156821 | A1 | * | 8/2003 | Manickavasagam et al. | 386/52 |
| 2004/0111418 | A1 | * | 6/2004 | Nguyen et al. | 707/100 |

(Continued)

FOREIGN PATENT DOCUMENTS

JP 1994237263 A 8/1994
JP 2001-309102 11/2001

(Continued)

OTHER PUBLICATIONS

Microsoft Computer Dictionary, 5th edition, p. 409.*
PCT Search Report and Written Opinion mailed Sep. 24, 2010 for PCT/KR2010/003839.
Katsuya; "Photoshop CS4 for Macintosh", http://www.sotechsha.co.jp/dokusha/, [English translation provided by Goggle Translate], dated Feb. 28, 2009, (6 pages).

*Primary Examiner* — Michelle Entezari
(74) *Attorney, Agent, or Firm* — Dorsey & Whitney LLP (57) ABSTRACT

Techniques and systems for media data customization system are provided. In one embodiment, a media data customization system includes a resource allocator that receives media data and a media data customization request and that allocates customization resources for a service of the media data customization request, a pipe repository that stores pipe filter modules, and a pipe manager that retrieves pipe filter modules stored in the pipe repository based on the media data customization request, that integrates the retrieved pipe filter modules to form a pipe group, and that applies the pipe group to the media data using the customization resources to generate customized media data.

26 Claims, 3 Drawing Sheets

(56) References Cited

U.S. PATENT DOCUMENTS

| | | |
|---|---|---|
| 2004/0117427 A1* | 6/2004 | Allen et al. .................... 709/200 |
| 2004/0196470 A1* | 10/2004 | Christiansen ................. 358/1.1 |
| 2005/0063352 A1* | 3/2005 | Amara et al. ................. 370/338 |
| 2005/0070262 A1 | 3/2005 | Weigand |
| 2006/0184982 A1 | 8/2006 | Paz et al. |
| 2006/0234765 A1 | 10/2006 | Herberger et al. |
| 2006/0294569 A1* | 12/2006 | Chung .......................... 725/133 |
| 2007/0061486 A1 | 3/2007 | Trinh et al. |
| 2007/0237412 A1* | 10/2007 | Mizuno ......................... 382/240 |
| 2008/0030590 A1* | 2/2008 | Ciudad et al. ............ 348/211.12 |
| 2008/0195997 A1 | 8/2008 | Herberger et al. |
| 2009/0138674 A1* | 5/2009 | Chang et al. .................... 712/23 |
| 2009/0263012 A1 | 10/2009 | Georgis et al. |
| 2010/0115233 A1* | 5/2010 | Brewer et al. ..................... 712/7 |
| 2011/0096933 A1* | 4/2011 | Eastty ............................. 381/56 |

FOREIGN PATENT DOCUMENTS

| | | |
|---|---|---|
| JP | 2002189672 A | 7/2002 |
| JP | 2003167832 A | 6/2003 |
| JP | 2003-283740 | 10/2003 |
| JP | 2004-326534 | 11/2004 |
| JP | 2004-362055 | 12/2004 |
| JP | 2007279829 A | 10/2007 |
| JP | 2009-268092 | 11/2009 |
| KR | 10-2007-0030041 | 3/2007 |
| WO | 2009/042961 | 4/2009 |

\* cited by examiner

MEDIA DATA CUSTOMIZATION

BACKGROUND

With the proliferation of mobile devices that support video, sound, and image, users of the mobile devices are requesting media data in the different formats supported by the various mobile devices. Also, users are increasingly wanting to customize the digital contents from their mobile devices by, for example, combining two or more different media data or applying various filters and different effects such as color change, blur, sharpening, mosaic, etc. Unfortunately, digital content customization, e.g., applying various filters to the digital contents, changing the digital content encoding formats, etc., requires considerable resources such as computing power, data storages, etc. However, these mobile devices typically have limited processing power, limited memory, short battery life, etc., and, thus, are unable to efficiently provide digital content customization functionality.

SUMMARY

According to an illustrative embodiment, a media data customization system includes a resource allocator that receives media data and a media data customization request and that allocates customization resources for a service of the media data customization request, a pipe repository that stores pipe filter modules, and a pipe manager that retrieves pipe filter modules stored in the pipe repository based on the media data customization request, that integrates the retrieved pipe filter modules to form a pipe group, and that applies the pipe group to the media data using the customization resources to generate customized media data.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

A media data customization system and corresponding methods for providing customized media data to service consumers are provided. In one illustrative embodiment, a media data customization system provides a service portal through which a registered service consumer, such as a registered user, can access the digital content customization services (e.g., media data filtering, encoding, etc.) provided by the media data customization system. By way of example, a user can use an application executing on a computing device, such as a user terminal, and access the service portal to register with the media data customization system by creating a user account. The service portal allows a registered user to upload media data that is to be customized and to specify the desired customization that is to be performed on the uploaded media data. For example, the registered user can specify the desired customization by selecting from a list of multimedia filters that are supported by the media data customization system, the desired multimedia filters that are to be applied to the uploaded media data. Third party vendors may provide and register the various multimedia filters such as, data format encoding filters, effect filters, sound filters, etc., with the media data customization system. The multimedia filters are modules that may be executed to customize the uploaded media data. Upon receiving a media data customization request, the media data customization system selects and provisions the appropriate resources necessary to service the received media data customization request. Provisioning of the appropriate resources may involve checking the multimedia filters requested (i.e., selected) by the user for compatibility with the uploaded media data, and scheduling the selected multimedia filters for execution. The media data customization system may also monitor the amount of resources that are consumed or used to service the media data customization request and may determine the appropriate amount to charge the user for the consumed resources (i.e., the customization service). Upon performing the customization, the media data customization system makes the customized media data available for retrieval through the service portal. The media data customization system may also provide an indication to the registered user who requested the customization of the completion of the registered user's media data customization request and the availability of the customized media data. The registered user can then retrieve (e.g., download) the customized media data through the service portal. In one embodiment, the media data customization system may implement a "pay-as-you-use" pricing model that charges the user for the cost proportional to the usage of computing resources. In this pricing model, the media data customization system may generate cost information based at least on a sum of the amount of source media data received by the media data customization system and the amount of the customized media data generated as a result of using the computing resources (i.e., the media data customization request).

Figure 1:
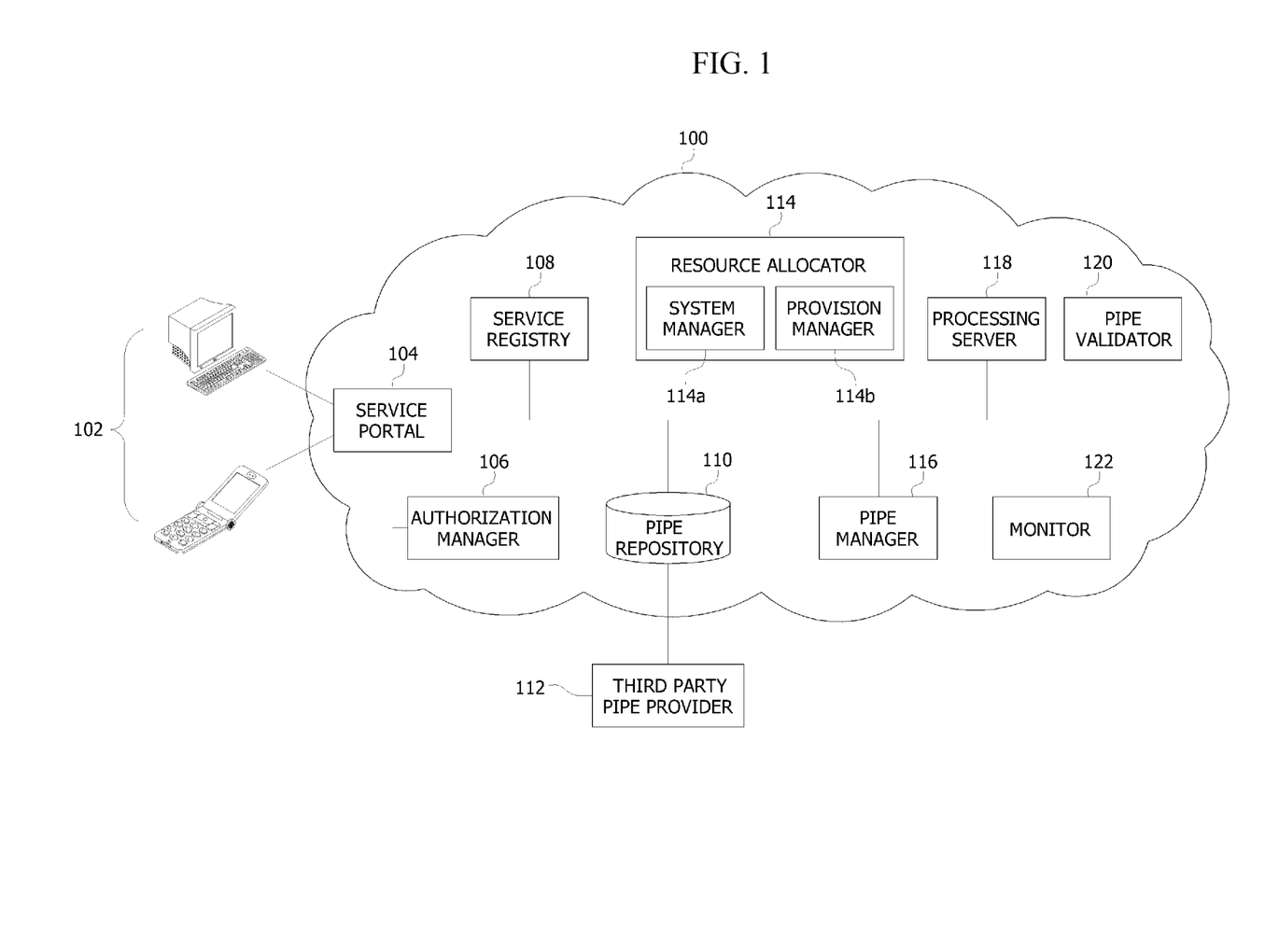
FIG. 1 shows an illustrative embodiment of a media data customization system.

FIG. 1 shows an illustrative embodiment of a media data customization system 100. As depicted, a user terminal 102 may be coupled to the media data customization system 100. The media data customization system 100 may include a service portal 104, a service registry 108, a pipe repository 110, a resource allocator 114, a pipe manager 116, a processing server 118, a pipe validator 120, and a monitor 122, where each component is coupled to at least one other component.

By way of example, the user terminal 102 may be a remote device that may be coupled to the media data customization system 100 via a network (not shown). The user terminal 102 may be used to submit media data and a media data customization request to the media data customization system 100 and retrieve the customized media data from the media data customization system 100 in return. The user terminal 102 can be a desktop computer or a mobile computing device such as a laptop, a mobile phone, a mobile device, or a PDA. Any computing device that provides the network connectivity can be the user terminal 102 in this embodiment.

The service portal 104 functions as one interface into the media data customization system 100. The service portal 104 provides access to the functionality and services offered by the media data customization system 100. By way of example, the service portal 104 may provide access to a display that lists the available media data customization services provided by the media data customization system 100. This list may be generated from information provided by and received from the service registry 108. The service portal 104 also receives the media data and the media data customization request from the user terminal 102. The media data customization request includes information regarding the desired media data customization services, for example, selected from the list of available media customization services, which are to be performed on the media data. In this regard, the service portal 104 serves as an interface between a registered user using the user terminal 102 and the media data customization system 100. By way of an illustrative example, the service portal 104 may be a web portal and the registered user can access the web portal using an application such as a web browser executing on the user terminal 102.

As depicted in FIG. 1, the service portal 104 may be coupled to an authorization manager 106. In an alternative embodiment, the authorization manager 106 may be implemented as part of the service portal 104. The authorization manager 106 performs user authentication according to user authentication information received from, for example, the user terminal 102. For example, the user authentication information may include the user's ID, password, the user's real name, etc. The authorization manager 106 determines whether the user authentication information received from the user terminal 102 is valid or not (i.e., whether the received user authentication information is that of a registered user), and provides notification regarding the validity of the user authentication information.

The service registry 108 may generate a list of available media data customization services. In alternative embodiments, the service registry 108 may provide information that may be used to generate the list of available media data customization services. The service registry 108 also receives the media data and the media data customization request from, for example, the user terminal 102 via the service portal 104. By way of example, the media data customization services may include, but not be limited to, providing encoding format converters of video/sound/image data, visual or sound effecters, or various kinds of filters such as blur, sharpening, mosaic, and so on.

The pipe repository 110 stores the media data customization services in the form of pipe filter modules that may be executed by the media data customization system 100. For example, one pipe filter module can be an encoder that converts video data to a particular video format, and another pipe filter module may be a sound effect filter that increases the volume of sound data within a certain range of frequencies. The list of available media data customization services is generated based on information regarding the pipe filter modules contained in the pipe repository 110. These pipe filter modules may be produced and provided by a third party pipe provider 112. The pipe filter modules provided by the third party pipe provider 112 are stored in the pipe repository 110.

The resource allocator 114 receives the media data and the media data customization request from the service registry 108 and allocates at least some of computing resources available to the media data customization system 100 as customization resources to service the media data customization request. As part of the allocation, the resource allocator 114 may schedule the allocated computing resources, including the appropriate pipe filter modules, for execution by the processing server 118. As depicted in FIG. 1, the resource allocator 114 may include a system manager 114a and a provision manager 114b. The system manager 114a manages the available computing resources and selects the customization resources from the available computing resources. The provision manager 114b provisions the selected customization resources to service the media data customization request. The media data customization in this illustrative embodiment is presented with elastic computing resources in that, the more pipe filter modules a user selects, the more computing resources are dynamically allocated as customization resources.

The pipe manager 116 receives information regarding the appropriate pipe filter modules needed to service the media data customization request from the resource allocator 114 and retrieves one or more pipe filter modules from the pipe repository 110 according to the received information. The pipe manager 116 then integrates the retrieved pipe filter modules to form a pipe group. The pipe group may be formed by combining the retrieved pipe filter modules in serial order, so each of the pipe filter modules can be applied to the media data one by one.

The processing server 118 applies each of the pipe filter modules in the pipe group to the media data using the customization resources allocated by the resource allocator 114. In some embodiments, the pipe filter modules in the pipe group may be applied sequentially. The processing server 118 may have enough computing resources to handle multiple media customization requests simultaneously. The computing resources include CPU resources, memory space, hard disk space, network connectivity, electrical power, etc.

The pipe validator 120 checks to determine whether the pipe filter modules in the pipe group are compatible with the media data or not. For example, if the media data are sound data while one of the retrieved pipe filter modules in the pipe group is a video effect filter, the pipe validator 20 determines that the pipe filter module is not compatible with the sound data and provides a notification, for example, an error notification regarding the incompatibility between the media data and the pipe filter module to the pipe manager 116.

The monitor 122 monitors the usage of the customization resources that are consumed or used to service the media data customization request and generates cost information according to the result of the monitoring. For example, the cost information may be generated based on a so-called "pay-as-you-use" pricing model that charges the user for resource usage in the form of "Filter Bandwidth." Filter Bandwidth is a sum of the amount of the media data inputted to the media data customization system 100 and the amount of the customized media data outputted from the media data customization system 100. Alternatively, the cost for the media data customization may be determined based on a flat-rate agreement between the user and a provider of the media data customization services.

By way of example, a user using the user terminal 102 can access the media data customization system 100 by connecting to the service portal 104. On connecting to the service portal 104, in some cases (e.g., if the user has not previously registered with the media data customization system 100), the user may be requested to register his/her profile to create a valid account, which may then be verified by the authorization manager 106. The service registry 108 may then generate a list of available media data customization services based on information regarding the pipe filter modules contained in the pipe repository 110, and the service portal 104 may display the list of available media data customization services on the user terminal 102 for viewing by the user. At this time, the user may use the user terminal 102 and the service portal 104 to submit a media data customization request. As part of this request, the user may be requested to upload media data that is to be customized to the media data customization system 100. The user may also be requested to select one or more pipe filter modules from the displayed list of available media data customization services based on the desired media data customization that is to be performed on the uploaded media data. For example, the user may select three (3) pipe filter modules for converting video format of the media data to MPEG-4, for changing their aspect ratio to 16:9, and for applying mosaics, respectively.

The resource allocator 114 may receive the media data and the media data customization request from the service registry 108 and allocate at least some of computing resources available on the media data customization system 100 as customization resources to service the media data customization request. As part of the allocation, the resource allocator 114 may schedule the allocated computing resources, including the appropriate pipe filter modules, for execution by the processing server 118. The pipe manager 116 may then retrieve one or more pipe filter modules from the pipe repository 110 according to the information necessary to identify the appropriate pipe filter modules needed to service the media data customization request from the resource allocator 114 and integrate the retrieved pipe filter modules to form a pipe group. The processing server 118 may then apply each of the pipe filter modules in the pipe group to the media data using the customization resources which are allocated by the resource allocator 114. When the application of each of the pipe groups to the media data is completed, the customized media data is generated. The pipe manager 116 may then receive the customized media data from the processing server 118 and deliver it to the service portal 104. The user can download the customized media data to the user terminal 102 or send it to other user terminals.

Figure 2:
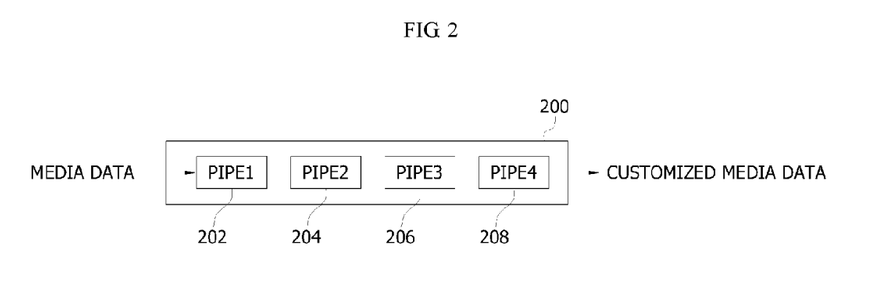
FIG. 2 shows an illustrative embodiment of a pipe group.

FIG. 2 shows an illustrative embodiment of a pipe group 200. As depicted, the pipe group 200 includes pipe filter modules 202, 204, 206, and 208. As discussed above, the pipe manager 116 may create the pipe group 200 to include one or more pipe filter modules. The number of pipe filter modules included in the pipe group 200 is determined according to a media data customization request received from, for example, a registered user. In some embodiments, the pipe filter modules 202, 204, 206, and 208 are arranged in series in the pipe group 200, and may be applied to the media data sequentially. In other words, the pipe filter module 202 is applied to the media data first, and then each of the pipe filter module 204, then the pipe filter module 206, and then the pipe filter module 208 is applied to the media data in the order of their arrangement.

Figure 3:
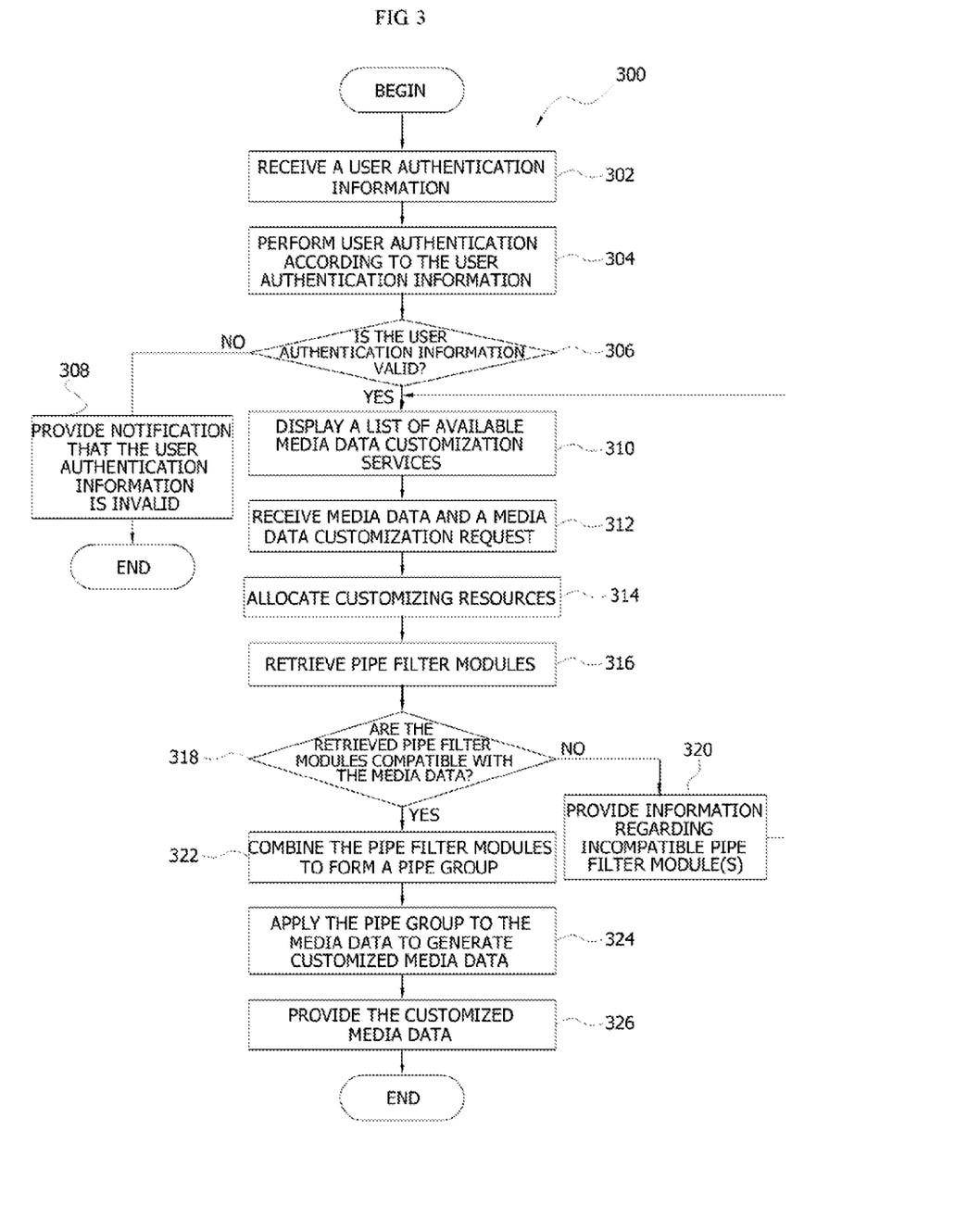
FIG. 3 is a flowchart of an illustrative embodiment of a method for processing a media data customization request.

FIG. 3 is a flowchart of an illustrative embodiment of a method 300 for processing a media data customization request. In block 302, the authorization manager 106 receives user authentication information of a user using the user terminal 102 via the service portal 104. In block 304, the authorization manager 106 performs user authentication according to the user authentication information. In block 306, the authorization manager 106 determines whether the user authentication information is valid or not. If the user authentication information is not valid, the authorization manager 106 provides notification that the received user authentication information is invalid to the service portal 104 in block 308 and the method 300 ends here. On the other hand, if the user authentication information is valid, in block 310, the service portal 104 displays a list of available media data customization services to the user terminal 102.

In block 312, the service portal 104 receives the media data and the media customization request from the user terminal 102. In block 314, the resource allocator 114 allocates at least some of computing resources available on the media data customization system 100 as customization resources to service the media data customization request. In block 316, the pipe manager 116 retrieves pipe filter modules from the pipe repository 110 corresponding to information regarding the appropriate pipe filter modules needed to service the media data customization request received from the resource allocator 114. In block 318, the pipe validator 120 checks to determine whether the retrieved pipe filter modules are compatible with the media data or not. If at least one of the retrieved pipe filter modules is not compatible with the media data customization request, the pipe validator 120 provides information regarding the at least one of the retrieved pipe filter modules to the pipe manager 116 in block 320, and control returns to block 310 to repeat the operations indicated in blocks 310 to 318. Or, in an alternative embodiment, if at least one of the retrieved pipe filter modules is not compatible with the media data customization request, the pipe manager 116 may form a pipe group excluding the incompatible pipe filter module(s). On the other hand, if all of the retrieved pipe filter modules are compatible with the media data, the pipe manager 116 combines the retrieved pipe filter modules and forms a pipe group in block 322.

In block 324, the processing server 118 applies the pipe group to the media data using the customization resources allocated by the resource allocator 114 and generates the customized media data. As discussed above, in some embodiments, the pipe filter modules in the pipe group may be applied sequentially. In block 326, the pipe manager 116 provides the customized media data available for retrieval through the service portal 104 to, for example, the user terminal 102. Further, after the customized media data is generated, the monitor 122 may generate cost information regarding the service of the media data customization request.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an"

should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A media data customization system comprising:
a resource allocator configured to receive media data and a media data customization request, the media data including at least one of audio data or video data, the resource allocator further configured to dynamically allocate computer resources to facilitate execution of the media data customization request, wherein the computer resources include at least one of processor resources, memory space, hard disk space, network connectivity, or electrical power;
a pipe repository configured to store a plurality of pipe filter modules including a first pipe filter module and a second pipe filter module, wherein the first pipe filter module is configured to perform a first customization operation on the received media data and the second pipe filter module is configured to perform a second customization operation that is of a different type of customization operation than the first customization operation; and
a pipe manager configured to select a subset of the plurality of pipe filter modules stored in the pipe repository based on the media data customization request, the pipe manager further configured to integrate the selected subset of the plurality of pipe filter modules to form a pipe group, wherein at least the first and second pipe filter modules are included in the subset of pipe filter modules that form the pipe group, wherein each of the plurality of pipe filter modules in the pipe group is configured to perform a specific customization operation type different from the customization operation types performed by other pipe filter modules of the pipe group, and also configured to apply the pipe group to the media data via use of the dynamically allocated computer resources to generate customized media data, wherein dynamic allocation of the computer resources by the resource allocator is based, at least in part, on a number of pipe filter modules in the selected subset of the plurality of pipe filter modules.

2. The system of claim 1, further comprising:
a service registry configured to generate a list of available media data customization services based on information that corresponds to the pipe filter modules contained in the pipe repository; and
a service portal configured to display the list of available media data customization services received from the service registry on a remote device;
wherein the service registry is further configured to receive the media data and the media data customization request from the remote device via the service portal and to transmit the received media data and the media data customization request to the resource allocator.

3. The system of claim 2, wherein the media data customization request comprises information that corresponds to particular media data customization services selected from the list of available media data customization services.

4. The system of claim 2, further comprising an authorization manager associated with the service portal and configured to perform user authentication in accordance with user authentication information received from the remote device.

5. The system of claim 2, wherein the pipe manager is further configured to make the customized media data available for retrieval through the service portal.

6. The system of claim 1, wherein the resource allocator comprises a system manager configured to manage available computer resources and to select the computer resources, which are to be dynamically allocated, from the available computer resources, and a provision manager configured to provision the selected computer resources to execute the media data customization request, the system further comprising:
a pipe validator associated with the pipe manager and configured to evaluate whether the pipe filter modules in the selected subset are compatible with the media data.

7. The system of claim 1, further comprising a pipe validator associated with the pipe manager and configured to evaluate whether the pipe filter modules in the selected subset are compatible with the media data.

8. The system of claim 7, wherein if at least one of the pipe filter modules in the selected subset is incompatible with the media data, the pipe validator is configured to provide information that corresponds to the at least one of the incompatible pipe filter modules to the pipe manager.

9. The system of claim 1, further comprising a monitor configured to monitor usage of the computer resources consumed to facilitate execution of the media data customization request and configured to generate cost information in accordance with a result of the monitored usage.

10. The system of claim 9, wherein the cost information is determined based on a sum of an amount of the received media data and an amount of the customized media data.

11. A computer implemented method to customize media data, comprising:
dynamically allocating computer resources for execution of a received media data customization request from available computer resources, wherein the computer resources include at least one of processor resources, memory space, hard disk space, network connectivity, or electrical power;
selecting a subset of a plurality of pipe filter modules based on the media data customization request, the subset of the plurality of pipe filter modules including a first pipe filter module and a second pipe filter module, the first pipe filter module being configured to perform a first customization operation on received media data and the second pipe filter module being configured to perform a second customization operation that is of a different type of customization operation than the first customization operation, wherein dynamically allocating the computer resources is based, at least in part, on a number of pipe filter modules in the selected subset of the plurality of pipe filter modules;
forming a pipe group by combining the selected subset of the plurality of pipe filter modules, wherein the pipe group includes at least the first and second pipe filter modules; and
applying the pipe group to the received media data using the computer resources to generate customized media data.

12. The method of claim 11, further comprising:
receiving user authentication information from a remote device; and
performing user authentication according to the user authentication information,
wherein the media data and media data customization request are received if the user authentication information is valid.

13. The method of claim 11, wherein selecting the subset of a plurality of pipe filter modules comprises evaluating whether the selected subset of the plurality of pipe filter modules are compatible with the media data.

14. The method of claim 13, wherein evaluating whether the selected subset of the plurality of pipe filter modules are compatible with the media data comprises, if at least one pipe filter module of the selected subset of the plurality of pipe filter modules is not compatible with the media data, providing information regarding the at least one of the incompatible pipe filter modules.

15. The method of claim 11, wherein dynamically allocating computer resources comprises selecting the computer resources from available computer resources and provisioning the selected computer resources to execute the media data customization request.

16. The method of claim 11 further comprising, posterior to applying the pipe group:
generating cost information regarding execution of the media data customization request.

17. The method of claim 16, wherein the cost information is determined based on a sum of an amount of the received media data and an amount of the customized media data.

18. A method for a media data customization system to provision one or more customization filters to an end user, the method comprising:
receiving, at a customization filter repository, a first customization filter, the first customization filter being configured to perform a first customization operation on received media data, the first customization filter being generated by a first party that is separate from the end user, wherein the first customization filter includes a first pipe filter module;
receiving, at the customization filter repository, a second customization filter, the second customization filter being configured to perform a second customization operation that is of a different type of customization operation from the first customization operation on the received media data, the second customization filter being generated by a second party that is separate from the end user and the first party, wherein the second customization filter includes a second pipe filter module;
receiving, at a processor, a customization request and media data from the end user, the customization request specifying specific customization operations to be performed on media data, wherein the media data received from the end user includes at least one of audio data or video data;
selecting, based on the received customization request, a subset of a plurality of customization filters usable for the specific customization operations;
dynamically allocating computer resources to enable the media customization system to facilitate execution of the specific customization operations, wherein the computer resources include at least one of processor resources, memory space, hard disk space, network connectivity, or electrical power;
generating a filter group that is formed from the selected subset of the plurality of customization filters, wherein the selected subset of customization filters that form the filter group includes the first and second customization filters, wherein dynamic allocation of the computer resources to enable the media customization system to facilitate execution of the specific customization operations is based, at least in part, on a number of filters in the filter group; and
applying the generated filter group to the media data provided by received from the end user so that the specific customization operations are performed.

19. The method of claim 18, further comprising:
determining that the first customization filter is no longer compatible with the media data received from the end user after the filter group has been applied to the media data; and
removing the first customization filter from the filter group.

20. The system of claim 2, wherein, responsive to a request from the remote device, the service registry is further configured to provide the customized media data to the remote device via the service portal.

21. The method of claim 18, after applying the generated filter group to the media data received from the end user, providing the media data back to the end user.

22. The method of claim 12, further comprising providing the customized media data to the remote device.

23. The method of claim 18, wherein allocating the computer resources to enable the media customization system to facilitate execution of the specific customization operations based, at least in part, on the number of filters in the filter group includes allocation of additional computer resources as the number of filters in the filter group increases.

24. The system of claim 2, wherein dynamic allocation of the computer resources by the resource allocator based, at least in part, on a number of pipe filter modules in the selected subset of the plurality of pipe filter modules includes allocation of additional computer resources as the number of pipe filter modules increases.

25. The method of claim 11, wherein dynamically allocating the computer resources based, at least in part, on a number of pipe filter modules in the selected subset of the plurality of pipe filter modules includes allocation of additional computer resources as the number of pipe filter modules increases.

26. The method of claim 18, further comprising storing the plurality of customization filters a pipe repository.

* * * * *